United States Patent
Legrand et al.

(10) Patent No.: US 9,802,366 B2
(45) Date of Patent: Oct. 31, 2017

(54) METHOD FOR MANUFACTURING A PLURALITY OF PREFORMS FOR REINFORCING MEMBERS

(71) Applicants: Airbus Operations (SAS), Toulouse (FR); Carbone Forge, Chaponost (FR)

(72) Inventors: Xavier Legrand, Roubaix (FR); Philippe Blot, Nantes (FR); Pascal Vinot, Sainte Luce sur Loire (FR); Christope Marchand, Reze (FR); Alain Cavet, Meximieux (FR)

(73) Assignee: Airbus Operations SAS, Toulouse (FR)

(*) Notice: Subject to any disclaimer, the term of this patent is extended or adjusted under 35 U.S.C. 154(b) by 461 days.

(21) Appl. No.: 14/480,829

(22) Filed: Sep. 9, 2014

(65) Prior Publication Data

US 2014/0377491 A1 Dec. 25, 2014

Related U.S. Application Data

(63) Continuation of application No. PCT/FR2013/050501, filed on Mar. 11, 2013.

(30) Foreign Application Priority Data

Mar. 12, 2012 (FR) .................................. 12 52179

(51) Int. Cl.
*B29C 70/34* (2006.01)
*B29B 11/16* (2006.01)
(Continued)

(52) U.S. Cl.
CPC ............ *B29C 70/347* (2013.01); *B29B 11/16* (2013.01); *B29C 70/24* (2013.01); *B29C 70/545* (2013.01);
(Continued)

(58) Field of Classification Search
CPC ..... B29C 70/347; B29C 70/545; B29C 70/24; D03D 1/00; D03D 3/02; B29B 1/16; B29D 99/0003
See application file for complete search history.

(56) References Cited

U.S. PATENT DOCUMENTS

2002/0081415 A1  6/2002  Toi et al.
2004/0244859 A1  12/2004  Kern et al.
(Continued)

FOREIGN PATENT DOCUMENTS

CN        1341051       3/2002
CN       101394988      3/2009
(Continued)

OTHER PUBLICATIONS

International Search Report, May 7, 2013.
Chinese Search Report, Sep. 11, 2014.

*Primary Examiner* — Moshe Wilensky
(74) *Attorney, Agent, or Firm* — Greer, Burns & Crain Ltd.

(57) ABSTRACT

A method of manufacturing a plurality of reinforcing element preforms, involving the steps of: positioning reinforcing elements on the external surface of a die; assembling the reinforcing elements thus positioned with one another so as to form a textile sleeve with a longitudinal axis and surrounding the die; moving the sleeve longitudinally toward a multi-cavity mandrel having an elongate overall shape, the multi-cavity mandrel having on its external surface a plurality of longitudinal cavities which are distributed, when viewed in cross section, around the periphery of the external surface; forming the sleeve on the plurality of peripheral cavities so that the sleeve conforms to the shape of the multi-cavity mandrel and thus adopts the shape of a set of reinforcing element preforms.

15 Claims, 4 Drawing Sheets

(51) Int. Cl.
  *B29D 99/00* (2010.01)
  *B29C 70/24* (2006.01)
  *B29C 70/54* (2006.01)
  *D03D 1/00* (2006.01)
  *D03D 3/02* (2006.01)
  *B29K 63/00* (2006.01)
  *B29K 105/08* (2006.01)
  *B29L 31/00* (2006.01)

(52) U.S. Cl.
  CPC ........... *B29D 99/0003* (2013.01); *D03D 1/00* (2013.01); *D03D 3/02* (2013.01); *B29K 2063/00* (2013.01); *B29K 2105/089* (2013.01); *B29L 2031/003* (2013.01); *D10B 2505/02* (2013.01); *D10B 2505/12* (2013.01); *Y10T 428/1362* (2015.01)

(56) References Cited

U.S. PATENT DOCUMENTS

| | | |
|---|---|---|
| 2009/0050263 A1 | 2/2009 | Suzuki et al. |
| 2010/0109184 A1 | 5/2010 | Schreiber et al. |
| 2011/0081511 A1 | 4/2011 | Desjoyeaux |

FOREIGN PATENT DOCUMENTS

| | | |
|---|---|---|
| CN | 102046348 | 5/2011 |
| EP | 1170117 | 1/2002 |
| EP | 2184439 | 5/2010 |
| FR | 2843758 | 2/2004 |
| JP | 2002187599 | 7/2002 |
| WO | 2010000990 | 1/2010 |

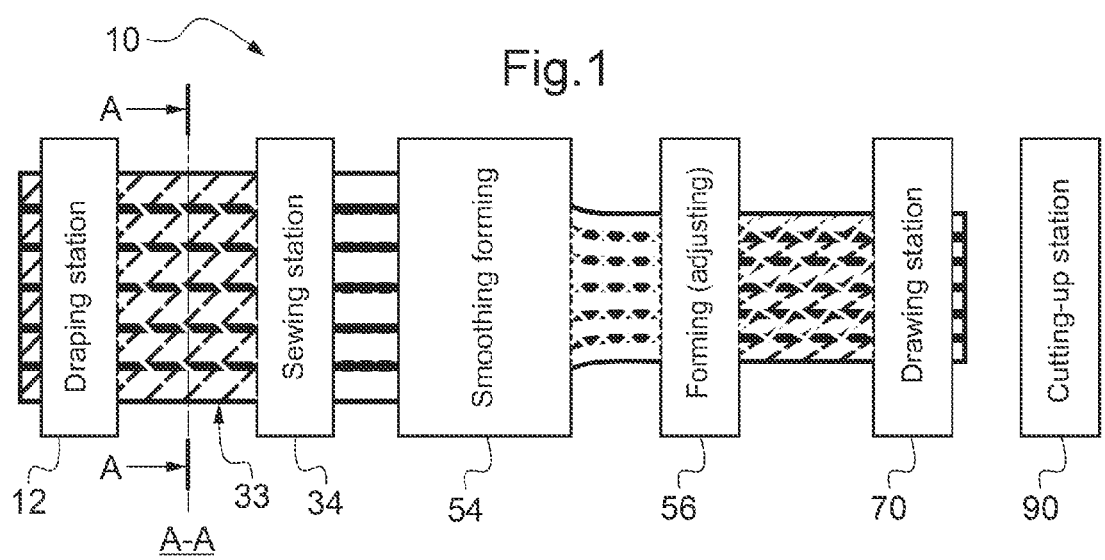
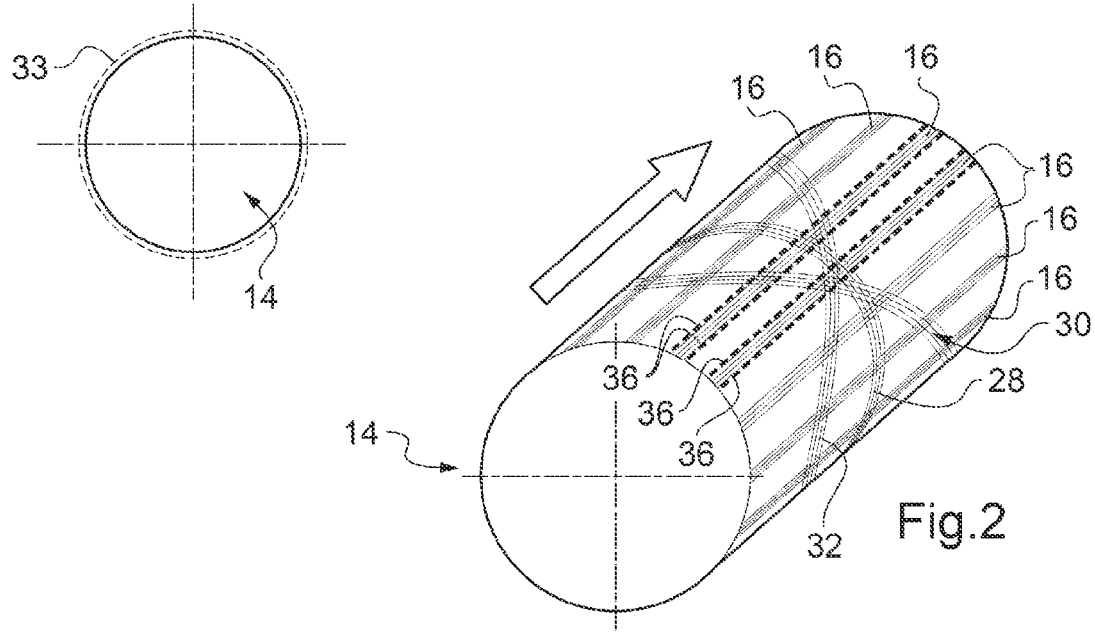
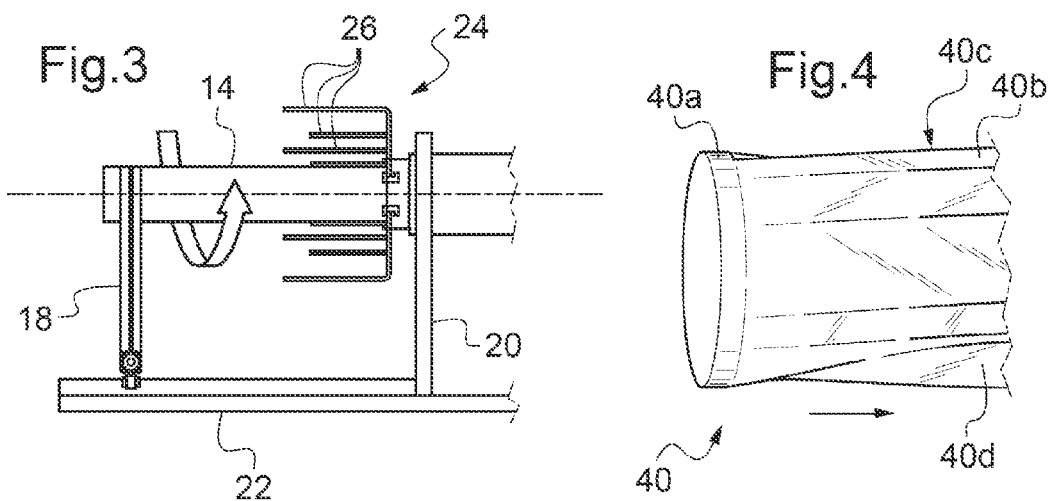

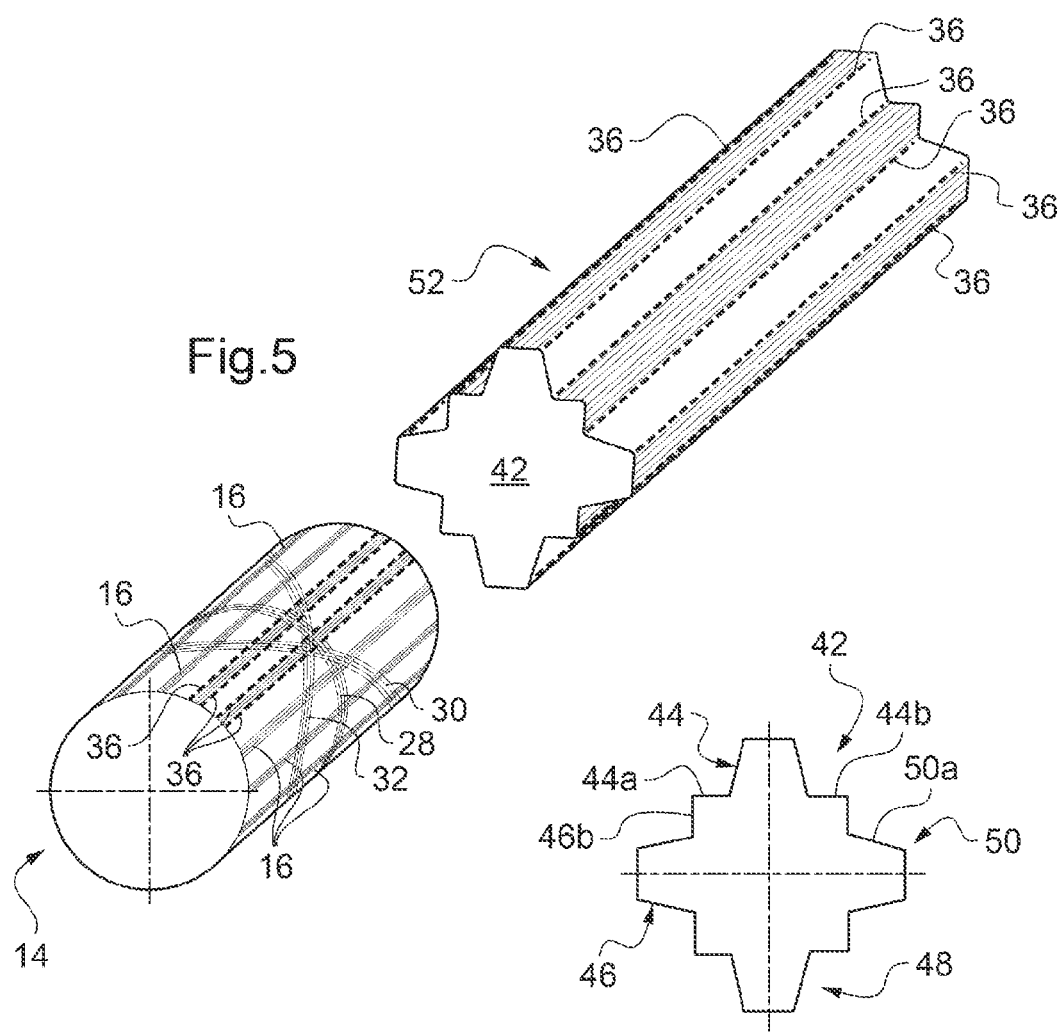
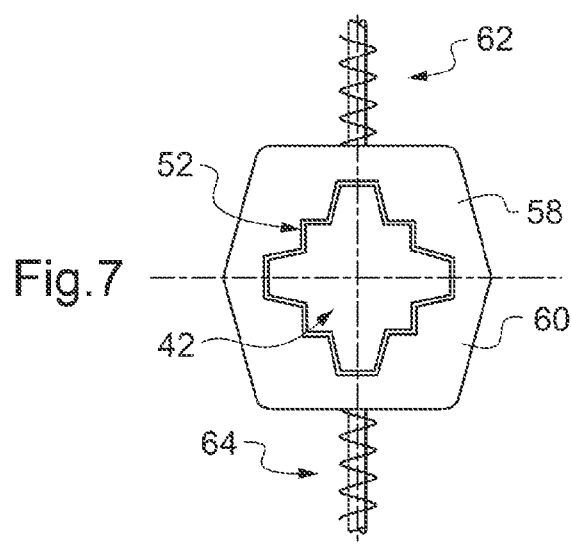

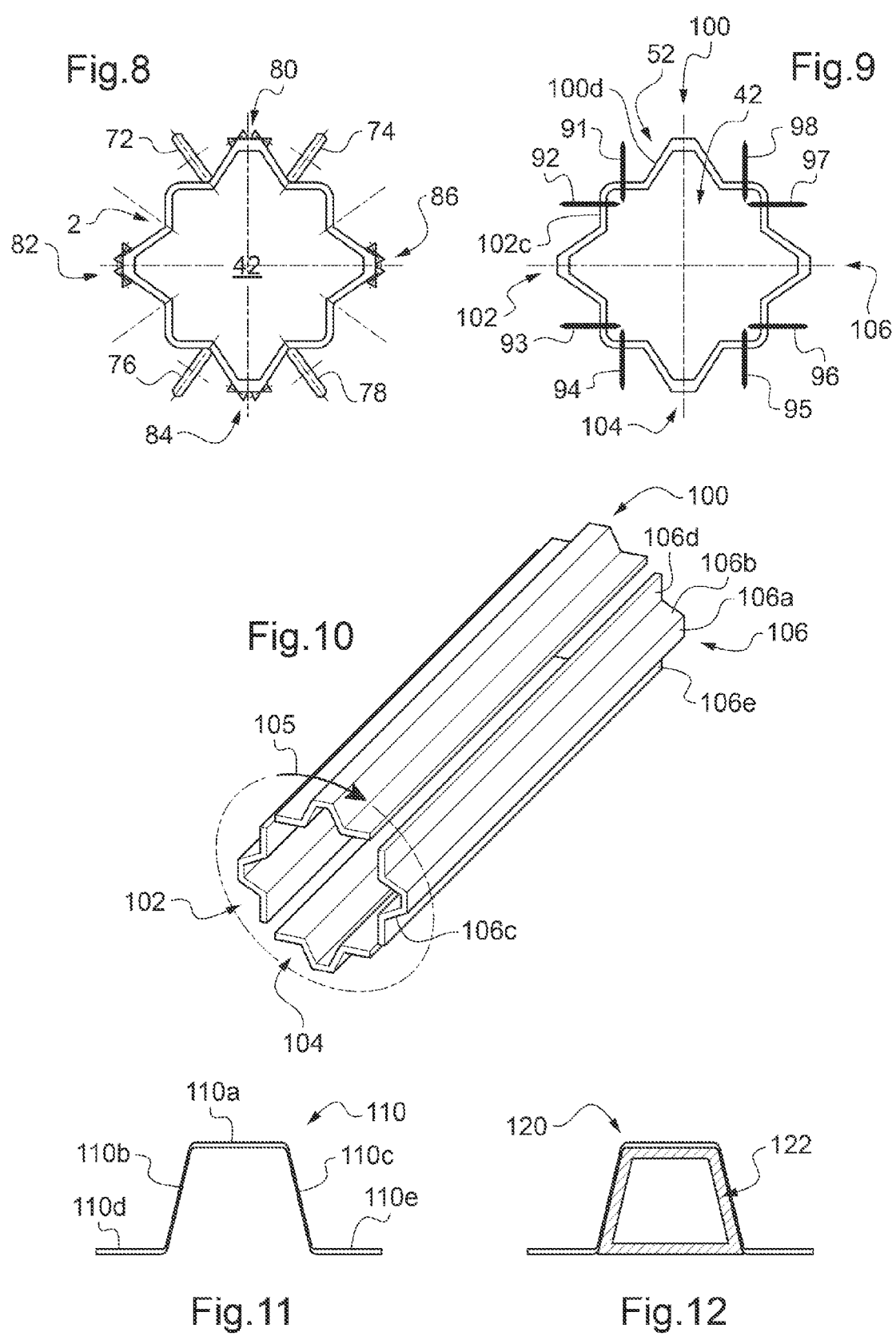

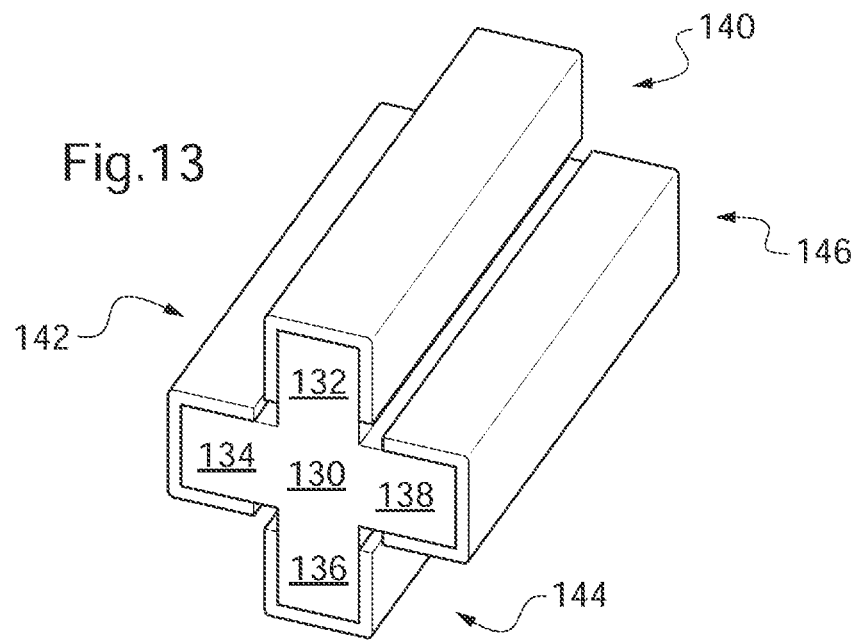
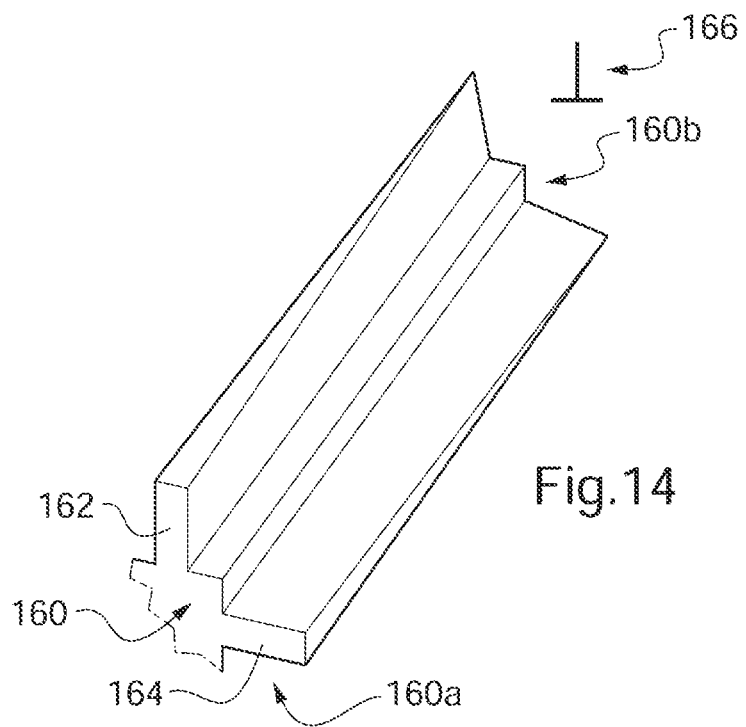

METHOD FOR MANUFACTURING A PLURALITY OF PREFORMS FOR REINFORCING MEMBERS

CROSS-REFERENCES TO RELATED APPLICATIONS

This application is a continuation of International Application PCT/FR2013/050501 filed Mar. 11, 2013, designating the United States and published on Sep. 19, 2013 as WO 2013/136001. This application also claims the benefit of the French patent application No. 1252179 filed on Mar. 11, 2013. The entire disclosures of the above are incorporated herein by way of reference.

BACKGROUND OF THE INVENTION

The invention relates to a method of manufacturing structural reinforcing members called stiffeners.

A structure such as an aircraft fuselage comprises in particular a skin or covering and reinforcing members or stiffeners which are fastened to the skin and, for example, are disposed longitudinally relative to the longitudinal axis of the fuselage.

These stiffeners are members of elongate general shape and have a cross-section of given shape, for example Omega-shaped, T-shaped, etc.

A stiffener is generally manufactured from a textile preform.

As regards the preform, this is manufactured by flat draping then forming on a die of adapted shape under the action of a mold/press. The assembly is generally subjected to a preforming heat cycle to give cohesion to the textile preform by bonding the strands, the layers or the plies together either by polymerization of a thermosetting powder or by melting a thermoplastic material both deposited in small quantity on the plies.

However, the methods of the prior art do not make it possible to attain high increases in productivity and to manufacture preforms of great length.

SUMMARY OF THE INVENTION

The present invention is directed to mitigating at least one of the aforesaid drawbacks by providing a method of manufacturing a plurality of preforms for reinforcing members, characterized in that it comprises the following steps:
  positioning strengthening elements on the outside surface of a die,
  assembling together the strengthening elements so positioned in order to form around the die a textile sleeve (having cohesion) having a longitudinal axis and surrounding the die,
  moving said sleeve longitudinally towards a multi-cavity mandrel of elongate general shape, the multi-cavity mandrel comprising on the outside surface of said mandrel a plurality of longitudinal cavities which are distributed, as viewed in cross-section, around the periphery of the outside surface,
  forming the textile sleeve on the plurality of peripheral cavities of the multi-cavity mandrel in order for said sleeve to conform to the multi-cavity form of said mandrel and thus take the shape of a assembly of preforms for reinforcing members.

The use of such a multi-cavity mandrel makes it possible to simultaneously manufacture several preforms and thus increase productivity relative to the prior art.

Furthermore, since the textile sleeve is transformed on the multi-cavity mandrel into an assembly of the preforms for reinforcing members and since the textile sleeve and the assembly of preforms are moved continuously on the tools (die and mandrel, etc.) of the production line, it is thus possible to manufacture preforms of great length without the need to have tools (dies, mandrels, etc.) of great length.

Each cavity of the multi-cavity mandrel has a shape in cross-section corresponding to that of a cross-section of a preform of a reinforcing member.

The cavities are distributed all around the mandrel so making it possible in a single pass of the textile sleeve on the mandrel to manufacture a plurality of preforms where, in the prior art, a single preform is produced at a time.

It should be noted that the die is for example of cylindrical shape and of circular cross-section and the sleeve formed on the die has for example the shape of a cylindrical sleeve.

According to a possible feature, the textile sleeve is moved longitudinally of the die on a mandrel of longitudinal general shape with a cross-section changing along its length before continuing its movement towards the multi-cavity mandrel, the mandrel having, at an upstream end, a cross-section disposed immediately downstream of the die and of the same cross-section as that of said die and, at an opposite downstream end, a multi-cavity cross-section.

This sleeve with a changing cross-section ensures the transition between the die upstream and the multi-cavity mandrel downstream in order to provide continuous and progressive transformation of the cylindrical surface of the die into a surface in relief (for example a toothed, crenelated or fluted surface) of the multi-cavity mandrel).

It should be noted that the mandrel with a changing cross-section may form part of a single piece together with the multi-cavity mandrel or alternatively constitute a separate piece.

It should be noted that in each cross-section of the die and of the multi-cavity mandrel the perimeter of the outside surface of the tool considered is the same.

According to a possible feature, the method comprises a step of heating the textile sleeve. For example, the mandrel provides heat over at least part of its length.

The heating, for example by a source of heat arranged internally of the mandrel, enables the assembly of the preforms for reinforcing members derived from the sleeve to perfectly conform to the shape of the outside surface in relief of the multi-cavity mandrel and thereby adopt the shape desired for the textile preforms.

The heating first of all aims to soften the textile sleeve by melting the thermoplastic or epoxy powder which covers the strengthening elements. Maintaining the heating makes it possible to fix the shape of the sleeve by polymerization of the epoxy powder.

When the link is of thermoplastics material it is the cooling of the sleeve which enables the shape to be set.

It should be noted that the multi-cavity mandrel may provide heat over its entire length.

Heat may also be provided by a mold surrounding the sleeve, the sleeve being disposed on the mandrel.

Where the mandrel with a changing cross-section is distinct from the multi-cavity mandrel, only the multi-cavity mandrel may be heated.

According to a first alternative, the part of the mandrel with a changing cross-section which comprises at its downstream end a multi-cavity cross-section may also be heated, or even the whole of the changing cross-section mandrel.

Where the mandrel with a changing cross-section and the multi-cavity mandrel form a single piece, a single part of the mandrel may be heated, i.e. that bearing the set of cross-sections of the plurality of cavities or the entirety of the mandrel over its whole length.

According to a possible feature, the method comprises a step of adjusting the thicknesses and the geometry of the cross-section of the assembly of the preforms for reinforcing members carried by the multi-cavity mandrel, between the latter and an outside mold of shape complementary to that of said mandrel. This step makes it possible to adjust the thicknesses and fix the geometry of the preforms.

At this step, the structure of the assembly of the preforms for reinforcing members, also called overall preform, is rigidified.

This rigidification is for example obtained by cooling that overall preform of constant cross-section.

According to another possible feature, the method comprises a step of drawing, continuously or discontinuously, the assembly of preforms for reinforcing members.

The assembly of the preforms for reinforcing members is thus drawn continuously or discontinuously on the multi-cavity mandrel by a drawing station situated downstream of said mandrel in the production line.

According to another possible feature, the method comprises a step of cooling the assembly of the preforms for reinforcing members.

As already mentioned, this step may take place at the adjusting step.

According to a possible feature, the strengthening elements are strands or layers.

According to a possible feature, the die having an elongate general shape, the strengthening elements are positioned along the outside surface of the die with several angular orientations.

According to a possible feature dependent on the preceding one, the strengthening elements are positioned on the die both with an angular orientation of 0° corresponding to the longitudinal direction of the die and with at least one different angular orientation.

The strengthening elements are thus positioned by unreeling at an unreeling station with the angular orientation of 0° (direction of movement of the textile sleeve). The other strengthening elements are positioned with another orientation or with several other angular orientations, for example by winding on the die in case of strands or layers.

The positioning of these strengthening elements with the desired angular orientation or orientations may be carried out, for example automatically, by varying the rotation speed of the bobbins carrying the strengthening elements (at the unreeling station) and according to the speed of advancement of the strengthening elements having an angular orientation of 0°.

According to a possible feature, the distribution of the strengthening elements at 0° is not uniform in order to adjust, for example optimize, the cross-section of the preforms for the reinforcing members (stiffeners).

According to a possible feature dependent upon the previous one, said at least one different (non-zero) angular orientation comprises an angle of 90° and angles of +θ and −θ relative to the longitudinal direction of the die.

Such an arrangement of the strengthening elements makes it possible to constitute a strong preform structure.

It should be noted that the assembly together of the strengthening elements may be carried out by sewing or by welding.

This assembly formed by the strengthening elements that are wound (with a non-zero angular orientation) and the longitudinal strengthening elements (at 0°) procures cohesion for the whole of each preform for the purpose of later forming on the multi-cavity sleeve without creating disorientation between the various strengthening elements.

It will also be noted that this cohesion is necessary to facilitate the downstream drawing of the assembly of preforms.

According to a possible feature, the method comprises a step of longitudinal cutting up of the assembly of the preforms for reinforcing members in order to longitudinally separate each preform from the two adjacent preforms that are disposed on opposite sides.

Thus, the assembly of the preforms for reinforcing members which are manufactured continuously on the production line may be longitudinally cut up in order to separate each of the preforms from the assembly of said preforms.

Each preform thus manufactured is of the same length as the other preforms of the assembly.

According to a possible feature, each preform is of Omega-, T-, U-, C- or I-shaped general cross-section.

According to a possible feature, each preform for a reinforcing member has in cross-section a convex shape comprising a substantially planar hat from which extend on opposite sides thereof two lateral flanks which respectively terminate with two flanges.

The overall cross-section of the assembly of the preforms for reinforcing members which joins together all the local cross-sections of each preform in the general shape of a toothed cog or wheel in which each tooth constitutes a preform.

Other shapes/profiles/cross-sections for preforms may of course be envisioned.

It should be noted that on a multi-cavity mandrel it can also be envisioned to manufacture an assembly of preforms of which one or more preforms differ from each other by their general shape. For example, it may be envisaged to manufacture Omega- and U-shaped preforms at the same time.

According to a possible feature, at least some of the preforms of the assembly of the preforms for reinforcing members have a thickness in cross-section which varies from one preform to another and/or at least one preform has a thickness in cross-section which varies between two members constituting said at least one preform.

Thus, on the same multi-cavity mandrel with different cavities it is possible to obtain preforms with cross-sections (or thicknesses of the members or parts of the same preform) that differ from one cross-section to another and/or from one preform to another. It should be noted that the cross-sections do not vary along the length of the preforms.

According to a possible feature, the reinforcing members are aircraft fuselage stiffeners.

The invention also relates to a device for manufacturing a plurality of preforms for reinforcing members, characterized in that it comprises a multi-cavity mandrel having a longitudinal general shape and comprising, on the outside surface of said mandrel, a plurality of longitudinal cavities which are distributed, as viewed in cross-section, around the periphery of the outside surface.

The multi-cavity mandrel makes it possible to simultaneously format, on the outside surface thereof, a plurality of preforms for reinforcing members that are distributed with different angular orientations.

The manufacturing yield for the preforms is thus considerably increased.

According to a possible feature, the device comprises a mandrel of longitudinal general shape with a changing cross-section along its length, said mandrel having, at an end termed upstream end, a cross-section termed upstream cross-section and, at an opposite end termed downstream end, a multi-cavity cross-section termed downstream cross-section and which is different from the upstream cross-section.

According to another possible feature, the mandrel with a changing cross-section is distinct from the multi-cavity mandrel.

According to another possible feature, the mandrel provides heat over at least part of its length.

The invention also relates to a sleeve having an elongate general shape and comprising an assembly of preforms for elongate reinforcing members which are distributed, as viewed in cross-section, side by side on the periphery of said sleeve.

Such a sleeve may be obtained by the method briefly set out above or by another method.

According to a possible feature, each preform for reinforcing members is of Omega-, T-, U-, C- or I-shaped general cross-section.

BRIEF DESCRIPTION OF THE DRAWINGS

Other features and advantages will appear in the following description, which is given solely by way of non-limiting example and made with reference to the accompanying drawings in which:

FIG. 1 is a general diagrammatic view of a production line for preforms for reinforcing members according to the invention, FIG. 2 is a diagrammatic view in perspective of the strengthening elements assembled onto a die 14;

FIG. 3 is a diagrammatic illustration of a support for bobbins for strengthening elements arranged around the die of FIG. 2;

FIG. 4 diagrammatically illustrates a mandrel with a changing cross-section;

FIG. 5 represents in perspective a die 14 and a multi-cavity mandrel 42;

FIG. 6 is a view of a cross-section of the multi-cavity mandrel 42;

FIG. 7 represents the multi-cavity mandrel bearing an assembly of preforms between two shaping molds;

FIG. 8 illustrates the driving of the assembly of preforms on the production line;

FIG. 9 illustrates the tools for longitudinal cutting up of the assembly of preforms;

FIG. 10 illustrates a perspective view showing the plurality of preforms obtained after cutting up;

FIG. 11 is a view in cross-section of a preform of non-constant thickness;

FIG. 12 is a view in cross-section of a preform of deposited on a core;

FIGS. 13 and 14 diagrammatically illustrate several variant embodiments for multi-cavity mandrels

DETAILED DESCRIPTION OF THE PREFERRED EMBODIMENTS

As represented in FIG. 1 and designated by the general reference denoted 10, a production device or line for preforms for reinforcing members or stiffeners according to the invention comprises several positions or stations which will be described below.

The production line which will be described is for example automated.

The line comprises a first station 12 for draping (deposit of the strengthening elements) in which strengthening elements are positioned on the outside surface of a die, for example of cylindrical shape.

FIG. 2 illustrates the disposition of these strengthening elements at the periphery of the cylindrical die 14.

The strengthening elements used are for example strands or layers which are arranged with several angular orientations over the whole of or part of the length of the die.

As represented in FIG. 2, strengthening strands are disposed longitudinally over the outside peripheral surface of the die, right round it.

The strands that are oriented along the longitudinal axis of the die (angular orientation of 0°) are distributed in bundles of strands 16 angularly spaced from each other in a cross-section view. These strands are disposed in bundles on the outside surface of the cylindrical device for example to locally increase the amount of strands oriented at 0° in the stiffeners (for example in the flanges and the top of the Omega-shaped stiffeners).

The outside surface of the die is thus partially covered by these strengthening strands at 0°.

These strengthening elements 16 are put in place over the outside surface of the die by unreeling from bobbins of strengthening elements.

FIG. 3 illustrates very diagrammatically the cylindrical die 14 mounted via the frame 20 (the die is fastened only at its end 20) on a production lane bed 22.

A rotary support for bobbins of strengthening elements 24 is mounted coaxially to the die 14 and comprises a plurality of reeling members 26 aligned with the longitudinal direction of the die 14 and distributed all around the latter.

These reeling members are each adapted to receive a bobbin of a strengthening element.

These bobbins have not been represented in the interest of clarity.

The support 24 is capable of being rotationally driven around the longitudinal axis of the die by a motor that is not shown.

As represented in FIG. 2, other strengthening elements such as strengthening strands are positioned on the outside surface of the die 14 in bundles (like the bundles of strands 16) in non-zero angular orientations that are different from each other.

Thus, a plurality of transverse strengthening elements 28 is disposed with an angular orientation of 90° relative to those of the strengthening elements 16.

A plurality of oblique strengthening elements 30 are disposed with an angular orientation of +θ (θ is defined relative to the 0° direction) relative to the orientation of the strengthening elements 16 (longitudinal direction of the die) and a plurality of oblique strengthening elements 32 are disposed at an angle of −θ relative to the orientation of the strengthening elements 16.

The value of the angle θ varies and may for example take the following values 60°, 45°, 30°, according to the mechanical properties required for the stiffeners.

It should be noted that these transverse and oblique strengthening elements are wound continuously (in a helical path) from bobbins not shown, so as to cover the outside surface of the die.

The strengthening elements may be positioned with the transverse and oblique orientations by varying the rotational speed of the bobbins and by playing with the speed of advancement of the longitudinal strengthening elements (orientation at 0°).

It should be noted that the oblique and transverse strengthening elements may be constituted by strands or layers for example of carbon.

The different strengthening elements so positioned are intended to form an overall preform of fabric or a textile sleeve wound on the die. It should be noted that the reinforcing strands are particularly adapted to deformation of the sleeve so as to constitute different preforms.

FIG. 1 illustrates very diagrammatically the crossed arrangement of the various strengthening elements on the die.

When all the strengthening elements have been positioned as described above on the outside surface of the die, the latter is totally covered by the assembly of strengthening elements so constituted.

This assembly constitutes a kind of overall preform blank 33 represented very diagrammatically on the cross-section A-A by dashed line.

As represented in FIG. 1, the production line 10 comprises a following station 34 for sewing.

At this station, sewing of the strengthening elements is carried out by attaching them together by a known sewing technique, while taking care that the assembly of the strengthening elements fastened to each other maintains sufficient deformation capacity for the needs of the later operations.

The sewing operation is for example carried out using a tool comprising several sewing heads distributed over the periphery of a support surrounding the die 14 and which has not been shown on the Figures in the interest of clarity. Each sewing head comprises a sewing needle.

The seams made by that plurality of sewing heads are represented in FIG. 2 by dashed longitudinal lines 36.

Such lines are distributed over the whole circumference of the die.

The separation between two consecutive seam lines depends on several parameters and in particular on the strength properties and above all the deformation capacity that it is desired to confer to the assembly.

It should be noted that the strengthening elements may alternatively be welded, for example by thermoplastic binders.

It should be noted that the blank 33 or sleeve formed by the assembly of the strengthening elements is moved longitudinally (as represented very diagrammatically by the arrow in FIG. 2) on the die. The driving downstream of the blank is carried out at the location of a drawing station placed downstream of the production line. The translation of the blank or sleeve may be assisted by conveyor belts moving parallel to the generatrices of the cylindrical die.

The blank 33 constituted by the assembly of the strengthening elements forms a sort of cylindrical sleeve surrounding the die 14. This sleeve is displaced longitudinally on a mandrel of longitudinal general shape disposed downstream of the die and which has a changing cross-section along its length.

FIG. 4 is a diagrammatic view in perspective illustrating such a mandrel 40. It comprises at an end termed upstream end 40a an upstream cross-section of circular shape and of a diameter corresponding to that of the die and, at an opposite end termed downstream end 40b, a multi-cavity downstream cross-section different from the upstream cross-section.

The cross-section thus changes progressively between the upstream end and the downstream end to make the preform blank pass from the cylindrical die to a multi-cavity mandrel, while maintaining a perimeter of constant length.

The assembled strengthening elements of the blank (sleeve) are thus deformed progressively by following the progressive geometric change in the cross-section.

The downstream end 40b of the mandrel comprises on its outside surface a plurality of longitudinal cavities on which only two, 40c and 40d, are represented in FIG. 4.

These cavities are distributed, as viewed in cross-section, over the perimeter of the outside surface in the manner of teeth distributed at the periphery of a toothed gear.

A peripheral mold not shown is disposed around the blank in contact with the mandrel 40 in order to format the overall preform blank coming from the die over the plurality of peripheral cavities. This formatting enables the blank to begin to conform to the multi-cavity profile of the downstream end 40b of the mandrel 40.

The blank which is moved continuously next comes onto the multi-cavity mandrel 42 illustrated in FIG. 5.

FIG. 5 represents the die 14 which is disposed upstream of the mandrel 40 and the multi-cavity mandrel 42 disposed downstream of said mandrel 40 without however representing the latter.

The forming of the blank or sleeve on the mandrel 40 with a changing cross-section is only partial and only becomes definitive when that overall preform blank is brought onto the cavity 42 and terminates its deformation (forming) there.

Although not shown in the Figures, a mold is disposed around the mandrel 42 in order to finalize the forming of the blank on the outside surface of the mandrel.

This mold is heated to bring the blank to a sufficient temperature to enable it to adopt the geometry of the various cavities of the mandrel 42.

It should be noted that the mandrel 42 may also be heated to ensure a better temperature rise as well as better homogeneity of the temperature within the blank.

The blank is for example brought to a temperature of 120° to polymerize the epoxy powder deposited in small quantity on the strands or layers.

This forming step is carried out on the production line at a smoothing down station 54.

On the mandrel the overall preform blank thus takes the shape of an assembly of the preforms for reinforcing members 52 (overall preform).

As represented, the stitches or weld points that are aligned along the lines 36 on the die 14 have been spread apart from each other further to the deformation of the blank on the mandrel 40 and on the mandrel 42 in order to conform to the shape of the various peripheral cavities.

It should be noted that the multi-cavity mandrel 42 and the mandrel with a changing cross-section 40 may constitute a single part according to a variant not shown.

In a cross-sectional view, FIG. 6 illustrates the multi-cavity mandrel 42 and the plurality of cavities 44, 46, 48 and 50 formed at its periphery.

The assembly 52 of preforms for reinforcing members covers the entirety of the outside peripheral surface of the mandrel 42 and conforms to the profile of that surface as closely as possible.

As represented in FIG. 6, the cavities are 4 in number on this mandrel.

However, a different higher or lower number may be envisioned according to the applications and according to the diameter of said mandrel.

Each cavity for example has a generally omega-shaped cross-section (FIG. 6).

Each omega-shaped cavity is linked to an adjacent cavity at the location of the adjacent feet of the two adjacent omegas. Thus, the foot 44a of the cavity 44 meets the foot 46b of the cavity 46, these two feet being for example disposed substantially at a right angle. The same applies for the adjacent feet 44b of the cavity 44 and 50a of the cavity 50.

The production line 10 also comprises a station 56 for forming or adjusting thicknesses and geometry (FIG. 1) in which the assembly of reinforcing preforms 52 is cooled with a constant cross-section.

This cooling aims to rigidify the woven structure of the assembly of preforms.

As represented in FIG. 7, the assembly of preforms 52 which is moved continuously on the multi-cavity mandrel passes, at the location of station 56, between two molds, an upper mold 58 and a lower mold 60.

Each of these molds can be moved vertically via actuating means 62 and 64 that are known per se (for example elastically mounted slides) which, when commanded, enable the two upper and lower molds to be moved apart or together relative to the assembly of the preforms for reinforcing members which slides longitudinally on the multi-cavity mandrel 42.

As represented in FIG. 7, the assembly of the lower 60 and upper 58 molds each have an inside surface of shape complementary to that of the half-mandrel concerned (upper part or lower part of the mandrel 42) clad by the assembly of preforms 52.

The production line 10 comprises, downstream of the forming station 56, a drawing station 70 (FIG. 1) from which the assembly 52 of the preforms for reinforcing members is continuously drawn downstream.

Thus, the totality of the matter present on the entire production line from the draping station 12 (strengthening elements arranged around the die 14) to the drawing station 70 (assembly of preforms 52) is driven downstream of the production line.

A system of wheels, belts or longitudinal conveyer belts may be provided to drive the assembly of preforms 52 The components of this drive system are in contact with the preform, generally in the concave parts thereof, to have a good area of contact.

As represented in FIG. 8 which is a view in cross-section of the assembly of preforms 52 disposed on the mandrel 42, several drive wheels are disposed longitudinally relative to the longitudinal direction of the mandrel in various zones of the assembly of preforms.

The rotational axis or axes of these wheels are perpendicular to the longitudinal axis of the assembly 52 and of the mandrel 42.

These zones are distributed over the whole periphery of the assembly 52 so as to ensure driving of that assembly that as effective as possible and as regular as possible.

The drawing station is thus equipped with two drive wheels 72 and 74 disposed in the upper part of the assembly 52 symmetrically relative to a longitudinal median plane (vertical plane perpendicular to the plane of FIG. 8).

Similarly, in the lower part two drive wheels 76 and 78 which are symmetrical relative to the previous plane and symmetrical relative to the upper wheels 72 and 74 are provided.

In general terms, movement is imparted to each of these wheels under the action of motor means and possible gearing mechanisms not shown in the interest of clarity. Each wheel is in contact with a concave region of the assembly of preforms 52 (each wheel is situated in a hollow of the overall profile of the assembly of preforms 52).

Furthermore, drive rollers 80, 82, 84 and 86 are respectively disposed in contact with each of the preforms of the assembly of preforms 52 between the zones of contact with the rollers 72-78 (as the wheels are less wide than the rollers, they are in contact with the preform in the concave zones whereas the rollers are in contact with the preform in the convex zones).

In the example represented in FIG. 8, these rollers are respectively disposed in contact with the convex parts of each preform. In this case, as each preform has a shape comprising a substantially planar hat from which extend on both sides thereof two lateral flanks which terminate respectively by two flanges, the rollers 80 to 86 are respectively arranged in contact with the hats of the preforms. It should be noted that the rollers are useful if the traction system for the assembly of preforms is not sufficient. The rollers are then preferably placed on the convex parts, which are if possible planar, and are distributed regularly around the circumference to apply uniform traction.

The production line also comprises cooling means (not shown) of the assembly of preforms for reinforcing members.

These means are integrated into the production line at the location of the downstream part of the molds 58 and 60 in order to fix the geometry of the preform.

The multi-cavity mandrel 42 which serves as a support for the assembly of preforms so produced comes to an end at the drawing station 70 or downstream thereof.

The production line also comprises, downstream of the drawing station 70, a cutting-up station 90 (FIG. 1) where the assembly of preforms for reinforcing members obtained by the manufacturing method which has just been described is separated into a plurality of preforms.

Each preform is thus separated from the adjacent preforms during a step of longitudinal cutting-up of the assembly 52 during which the assembly 52 is still in movement. Several cutting blades are distributed in pairs which are each disposed at the location of the junction between two adjacent preforms at the periphery of the assembly 52.

More particularly, there are four pairs of cutting blades 91-92, 93-94, 95-96 and 97-98, the two blades of the same pair being disposed at right angles.

As represented in FIG. 9, these cutting units make it possible to separate the preforms 100, 102, 104 and 160 from each other.

The cutting blades of a pair of blades are respectively arranged perpendicular to the two adjacent flanges of two adjacent preforms as illustrated in FIG. 9. For example, the blade 91 is arranged in contact with the flange 100d of the preform 100 whereas the blade 92 is arranged in contact with the adjacent flange 102e of the adjacent preform 102.

The longitudinal cutting-up may be carried out by means of a rotary disk which cuts in a groove or by means of a blade which presses on an anvil having the shape of the multi-cavity mandrel 42.

FIG. 10 illustrates the plurality of longitudinal preforms (here 4 in number) 100, 102, 104 and 106 arising from the cutting-up operation set out above with reference to FIG. 9.

Each preform is constituted as described above and comprises in identical manner, as for the preform 106, a hat 106a from which extend laterally two flanks 106c and 106b, on opposite sides of the hat while forming an acute angle therewith.

The preform also comprises two flanges 106d and 106e which respectively extend from the opposite ends of the inclined lateral flanks 106b and 106c to the ends thereof that are in contact with the hat 106a. The flanges are parallel to the hat.

The flanges form the terminal parts of the preform and are disposed on opposite sides of the lateral flanks.

Each preform is thus generally omega-shaped in cross-section. However, other shapes of preforms for example U-, C-, I-, T-shaped, etc., may also be obtained by the method.

The method which has just been described thus makes it possible to simultaneously manufacture a plurality of preforms by virtue of a multi-cavity mandrel.

It is to be noted that a greater number of preforms may be produced in a single pass on the production line 10.

The transverse dimensions of the die 14, of the mandrel with a changing cross-section 40 and of the multi-cavity mandrel 42 (or of the single mandrel combining the mandrels 40 and 42) must be adapted accordingly.

The profile of the cross-section of the multi-cavity mandrel itself also varies according to the number of cavities it carries and the shape of each cavity.

The assembly of preforms 100, 102, 104 and 106 of FIGS. 9 and 10 are not only cut up longitudinally to separate the preforms from each other but also transversely as illustrated very diagrammatically by the circle 105 disposed in a cross-section.

This circle illustrates an operation of transverse cutting-up of the preforms in a transverse cutting plane, for example, with a cutting tool comprising a blade of carbide in order to produce preforms of the desired length.

The method of manufacture which has just been described makes it possible to manufacture preforms of longer length than those manufactured in the prior art due to the fact that the entirety of the material constituting the preforms is displaced continuously on manufacturing tools (die, mandrel, etc.) which therefore do not each need to be of the total length desired for one preform.

The transverse cutting-up may be carried out in two different ways. The support for cutting-up may follow the preform and thus be brought along in order not to stop the movement of the preform on cutting-up.

Alternatively, the support for cutting-up is not brought along and the preform support is thus stopped.

The system for depositing strengthening elements is mechanical and thus makes it possible to stop the depositing during the phase of longitudinal cutting-up.

It should be noted that the cross-section of each preform is not necessarily constant in all portions of the preform as illustrated in FIG. 11.

In particular, FIG. 11 illustrates a preform 110 comprising a hat 110a framed by two lateral flanks 110b and 110c as well as two terminal flanges 110d and 110e.

As represented in that Figure, the transverse thickness of the preform 110 is not constant from one flange to another. It is as a matter of fact thicker at the location of the hat and the flanges than at the lateral flanks.

This difference in thickness in cross-section (it being understood that the thickness for a given portion of preform (flange, flank, hat) is the same over the whole length of the preform) is for example obtained by the addition of strengthening elements such as unidirectional fibers in the hat and flanges during the manufacture.

This addition is made more particularly in the draping station 12 of FIG. 1.

It will be noted furthermore that the preforms may be manufactured with their core (by co-extrusion) necessary for the handling and molding (silicone, Teflon or other materials).

Thus, the preform co-extruded with its core may be directly integrated into a mold for injection of resin, which considerably facilitates the method.

More particularly, after the station for drawing the preform, cores 122 are placed in the mandrel 42. These cores will be progressively covered by the cut up preforms. When the cores have been completely covered the system is stopped. The preform is then cut up transversely downstream of the longitudinal cutting-up station, just upstream of those cores 122. It is then possible to handle the elementary preforms 100, 102, 104, 106 using those cores and to deposit them in a mold. New cores are then placed in the device for manufacturing stiffener preforms. The method of manufacturing may then resume its operation.

In FIG. 12 a preform 120 is represented which was manufactured with its core 122 on the production line of FIG. 1 with the changes set out above.

The preforms for reinforcing members obtained by the manufacturing method described above are, for example, aircraft fuselage stiffeners.

FIGS. 13 and 14 illustrate variant embodiments for preforms with different cross-sections.

FIG. 13 illustrates a configuration for a multi-cavity mandrel 130 in the form of a cross with four branches, 132, 134, 136, 138.

The preforms 140, 142, 144, 146 thus have a complementary cross-section.

Each preform thus has the shape of a horseshoe or inverted U.

In FIG. 13 the preforms have been represented after separation by cutting up the assembly combining all the preforms.

FIG. 14 illustrates another variant embodiment in which the upstream end 160a of the mandrel 160 partially represented has a general shape comprising several cavities in the shape of branches of a cross or crenels which are disposed relative to each other at acute angles (in FIG. 14 only two cavities 162 and 164 are represented in the interest of clarity).

At the opposite end 160b of the mandrel 160, termed downstream end, the shape of the cross-section of each cavity is that of an inverted T as represented by the general shape 166.

It should be noted that the mandrel 160 is a mandrel with a changing cross-section making it possible to transform a given cross-section at the upstream end of the mandrel into a different cross-section at the downstream end through following a progressive change in cross-section.

The mandrel 160 may thus, for example, be disposed downstream of a mandrel with a changing cross-section similar to the mandrel 40 and which changes a circular cross-section into a cross-shaped cross-section as represented by the upstream end of the mandrel in FIG. 14.

Alternatively, a single mandrel with a changing cross-section may replace the two consecutive mandrels with a changing cross-section.

It should be noted that other shapes of mandrel may be envisaged, as is the case for the mandrel 40.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for manufacturing a plurality of preforms for reinforcing members, comprising the steps:
positioning strengthening elements on the outside surface of a die,
assembling together the strengthening elements so positioned in order to form a textile sleeve having a longitudinal axis and surrounding the die,
moving said sleeve longitudinally towards a multi-cavity mandrel of elongate general shape, the multi-cavity mandrel comprising on the outside surface of said mandrel a plurality of longitudinal cavities which are distributed, as viewed in cross-section, around the periphery of the outside surface, and
forming the sleeve on the plurality of peripheral cavities of the multi-cavity mandrel in order for said sleeve to conform to the multi-cavity shape of said mandrel and thus take the shape of an assembly of preforms for reinforcing members.

2. The method according to claim 1, wherein the textile sleeve is moved longitudinally of the die on a mandrel of longitudinal general shape with a cross-section changing along its length before continuing its movement towards the multi-cavity mandrel, the mandrel having, at an upstream end, a cross-section disposed immediately downstream of the die and of the same cross-section as that of said die and, at an opposite downstream end, a multi-cavity cross-section.

3. The method according to claim 2, further comprising a step of heating the textile sleeve.

4. The method according to claim 1, further comprising a step of adjusting the thicknesses and the geometry of the cross-section of the assembly of the preforms for reinforcing members carried by the multi-cavity mandrel, between the multi-cavity mandrel and an outside mold of shape complementary to that of said mandrel.

5. The method according to claim 1, further comprising a step of drawing the assembly of the preforms for reinforcing members.

6. The method according to claim 1, further comprising a step of cooling the assembly of the preforms for reinforcing members.

7. The method according to claim 1, wherein the strengthening elements are one of strands and layers.

8. The method according to claim 1, wherein the die has an elongate general shape and the strengthening elements are positioned along the outside surface of the die with several angular orientations.

9. The method according to claim 8, wherein the strengthening elements are positioned on the die both with an angular orientation of 0° corresponding to the longitudinal direction of the die and with at least one different angular orientation.

10. The method according to claim 9, wherein the distribution of the strengthening elements at 0° is not uniform.

11. The method according to claim 9, wherein said at least one different angular orientation comprises an angle of 90° and angles of +θ and −θ relative to the longitudinal direction of the die.

12. The method according to claim 1, further comprising a step of longitudinal cutting up of the assembly of the preforms for reinforcing members in order to longitudinally separate each preform from the adjacent preforms.

13. The method according to claim 1, wherein each preform is of one of Omega-, T-, U-, C- and I-shaped general cross-section.

14. The method according to claim 1, wherein at least some of the preforms of the assembly of the preforms for reinforcing members have a thickness in cross-section which varies from one preform to another and/or at least one preform has a thickness in cross-section which varies between two members constituting said at least one preform.

15. The method according to claim 1, wherein the reinforcing members are aircraft fuselage stiffeners.

* * * * *